United States Patent [19]

Suskind

[11] 4,286,897
[45] Sep. 1, 1981

[54] DOCK CLAMP APPARATUS

[76] Inventor: Philip A. Suskind, 416 Salt Springs Rd., Syracuse, N.Y. 13224

[21] Appl. No.: 110,127

[22] Filed: Jan. 7, 1980

[51] Int. Cl.$^3$ .............................................. F16B 2/04
[52] U.S. Cl. ........,............,........ 405/221; 248/225.4; 285/421; 403/371
[58] Field of Search ....................... 405/218, 220, 221; 285/342, 421; 248/225.4, 216.1, 218.4, 230; 403/370, 369, 371, 374

[56] References Cited

U.S. PATENT DOCUMENTS

| | | | |
|---|---|---|---|
| 2,741,497 | 4/1956 | Risley | 285/342 |
| 2,784,015 | 3/1957 | Swanson | 403/369 |
| 4,074,537 | 2/1978 | Gronlie | 405/218 |

Primary Examiner—Price C. Faw, Jr.
Assistant Examiner—Nancy J. Pistel

Attorney, Agent, or Firm—Marvin A. Goldenberg

[57] ABSTRACT

A dock clamp employed in combination with a dock support structure that supports a dock section at an adjusted height by means of post members that are slidable within corresponding sleeve members attached to the dock section, the dock clamp serving to provide a fixed frictional coupling between a pair of corresponding post and sleeve members. The dock clamp includes a pair of rigid pieces each having an open end and a pronged end with a tapered configuration that is wedged between corresponding post and sleeve members at opposing ends and at one side of the sleeve member for applying a radial force in a direction that drives said post and sleeve members together at the side opposite to said one side in response to an applied axial force. The dock clamp further includes fastener means for applying an axial force by forcing facing open ends of said pair of rigid pieces toward one another.

10 Claims, 3 Drawing Figures

DOCK CLAMP APPARATUS

BACKGROUND OF THE INVENTION

The invention relates generally to clamp apparatus and assemblies and, in particular, to such apparatus and assemblies employed with respect to dock support structures.

Boat docks of the type used for recreational and marine purposes, and the like, are normally installed in sections of eight foot lengths which are interlocked together, the first section having two pair and the others a single pair of sleeve members attached to either side of the sections. The sleeve members slide over corresponding post members which stand in the water, with clamp members employed to fix corresponding sleeve and post members to each other at the desired dock height. Clamping of the post and sleeve members is conventionally performed by drilling and tapping one or two holes in each sleeve member through which set screws are turned to force the sleeve and post members into frictional contact at the side opposite the screw holes. This method of providing a clamp between sleeve and post members has not been entirely satisfactory for a number of reasons. Since the sleeve is normally a relatively thin walled pipe, only a limited number of female screw threads can be formed for holding the set screws. In addition, the sleeve material is usually not rust inhibiting so that the female screw threads are subject to erosion. As a result, the post may wobble within its sleeve, or slippage of the dock may occur should the set screws loosen and/or break off after the dock is installed. A further limitation in this method of clamping is the need for drilling and tapping screw holes when fabricating the sleeve members, as well as to replace rusted out screw holes in an installed dock.

SUMMARY OF THE INVENTION

It is accordingly one object of the invention to provide a novel and improved dock clamp that provides a secure and permanent fastening of the post and sleeve members of a dock section to one another.

It is another object of the invention to provide a novel and improved dock clamp as above described providing a clamping action that will substantially entirely resist rust corrosive effects on the dock post and sleeve members.

It is a further object of the invention to provide a novel and improved dock clamp as above described which do not require screw holes to be drilled and tapped in the dock sleeve members.

With respect to a dock support structure for supporting a dock section at an adjusted height which includes at least a pair of post members slidable in the axial direction within corresponding sleeve members attached to either side of said dock section, these and other objects of the invention are accomplished by a dock clamp for securing said post members to corresponding sleeve members, comprising: prong means for insertion at opposing ends and at one side of one of said sleeve members between the inner wall of said sleeve member and the outer wall of a corresponding post member, said prong means being constructed so as to apply a radial force to said inner and outer walls in a direction that drives said walls together at the side opposite to said one side in response to an applied axial force, and fastener means for applying an axial force to said prong means, whereby the application of a sufficient axial force provides a fixed frictional coupling between corresponding post and sleeve members.

BRIEF DESCRIPTION OF THE DRAWINGS

While the specification concludes with the claims which particularly point out and distinctly claim that subject matter which is regarded as inventive, it is believed the invention will be more clearly understood when considering the following detailed description taken in connection with the accompanying figures of the drawings, in which:

DESCRIPTION OF THE PREFERRED EMBODIMENT

Figure 1:
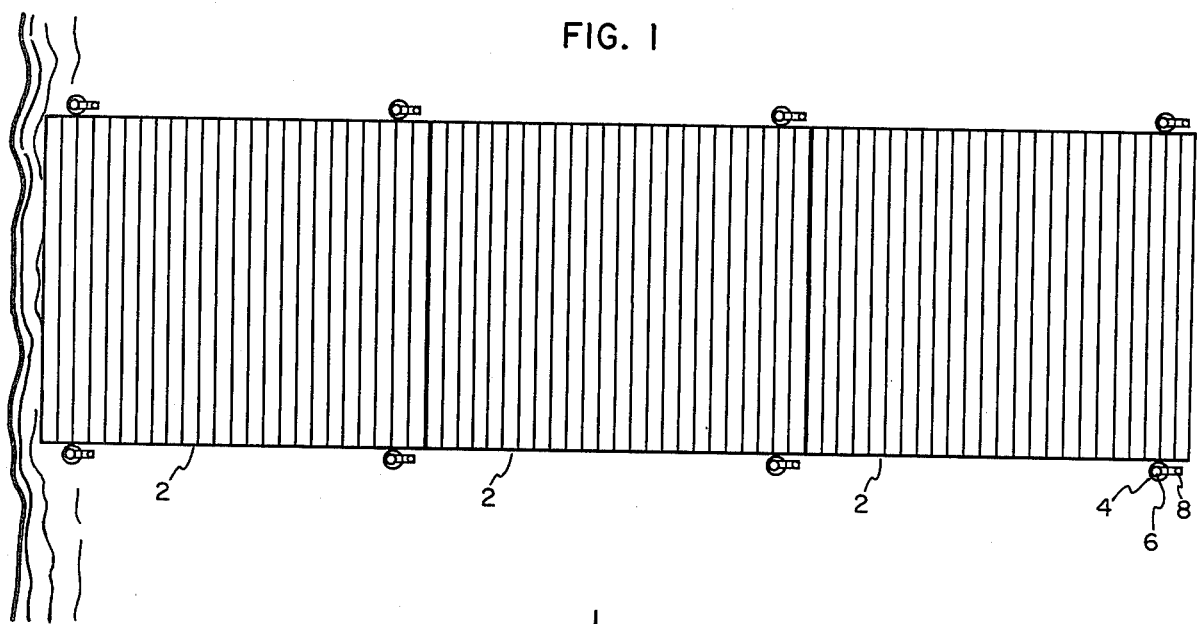
FIG. 1 is a plan view of several sections of a dock, and its support structure.

With respect to FIG. 1, there is illustrated a plan view of several sections 2 of a boat dock of the type used for recreational and marine purposes, and the like. Such dock sections are typically eight feet in length and made of wood, steel, aluminum, or styrofoam, or combinations thereof. They are joined together by interleaving and bolting their ends through a conventional arrangement the details of which are well known and need not be further considered. They are supported by a dock support structure including at lease one pair of sleeve members 4 attached to either side of each dock section which slide over corresponding post members 6 having a stable footing on the water bottom. As shown in FIG. 1, the first dock section has two pair of sleeve members for providing support at the four corners, and the remaining sections have one pair of sleeve members for providing support at the outside end.

Figure 2:
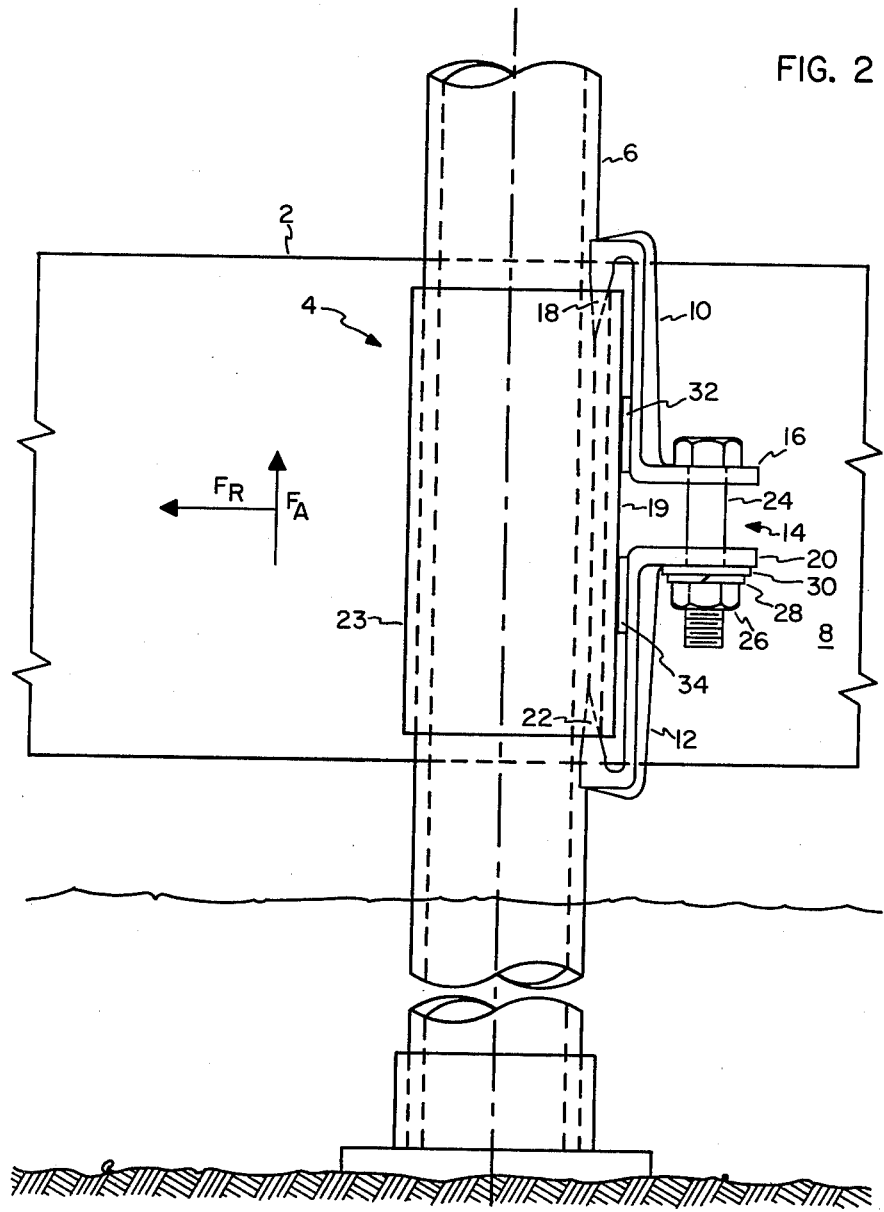
FIG. 2 is an enlarged front elevational view, in accordance with the invention, of a dock clamp of the dock support structure as illustrated in FIG. 1.
Figure 3:
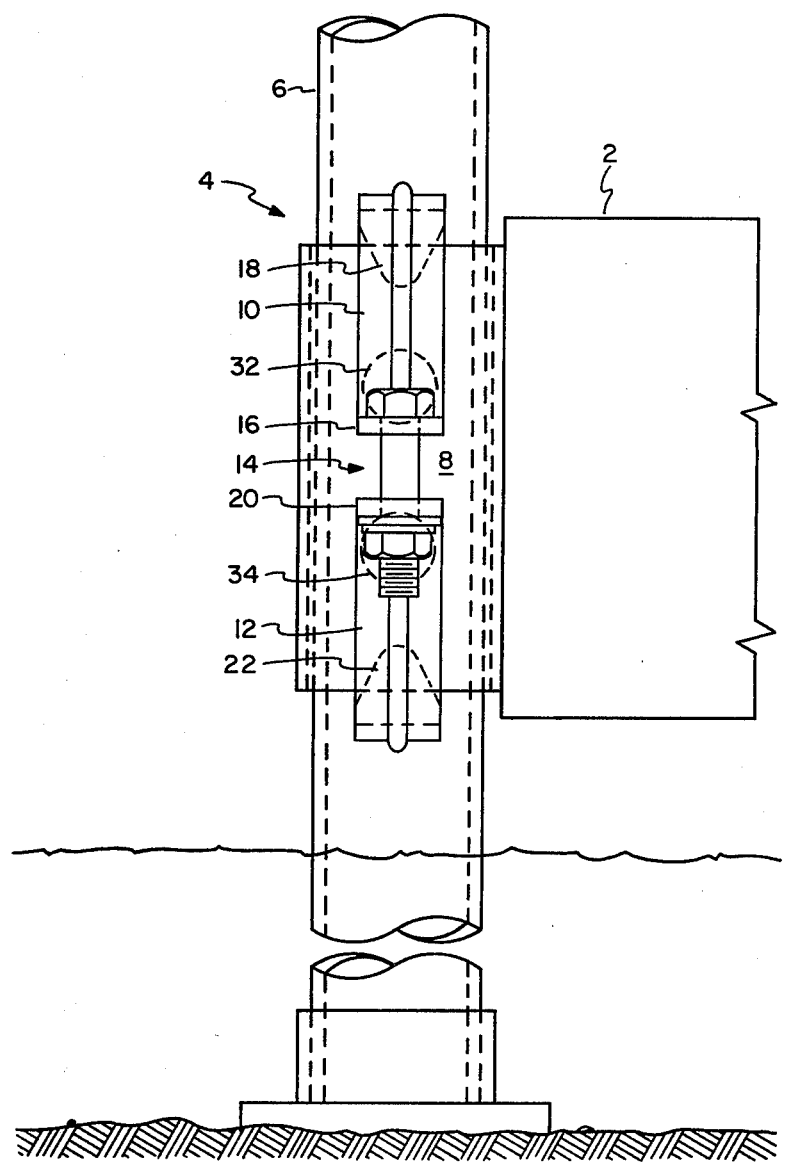
FIG. 3 is an enlarged side elevational view, in accordance with the invention, of a dock clamp of the dock support structure as illustrated in FIG. 1.

Referring to FIGS. 2 and 3 there is illustrated an enlarged front and side elevational view, respectively, of a dock clamp apparatus 8 employed to firmly couple a sleeve member 4 to its corresponding post member 6. The sleeve members 4 are normally an iron alloy about five inches in length, of about 1¾ inches outside diameter and about ⅛ inch in thickness, which are firmly attached to the sides of the dock sections by bolts or rivets, not shown in the drawing. The post members are also normally an iron alloy several feet in length and of about 1⅝ inches outside diameter. Thus, the inner wall of the sleeve members 4 are spaced in close proximity, typically about 1/16 of an inch, from the outer wall of the post members 6 when the two members are centered on one another. It is noted that the recited dimensions are exemplary and not intended to be limiting of the invention.

The clamp apparatus 8 is composed of a pair of identical pronged pieces 10 and 12 and a nut and bolt assembly 14, which are each fabricated from a high strength, rust resistant material, typically an aluminum-magnesium alloy or stainless steel. The piece 10 has an apertured flanged end 16 and a pronged end 18 wedged between the inner wall of sleeve member 4 and the outer wall of post member 6 at the upper end and at one side 19 of the sleeve member. Similarly, the piece 12 has an apertured flanged end 20 and a pronged end 22 wedged between said inner and outer walls at the lower end and at said one side of the sleeve member. The pronged ends 18 and 22 have a tapered construction for applying a radial force to the inner and outer walls in a direction along one of the radii of the post and sleeve members, shown by an arrow $F_R$, that drives said walls together at the side 23 opposite to said one side 19 in response to an applied axial force, shown by an arrow $F_A$. It may be appreciated that the thickness of the pronged ends 18 and 22 at the base portion of the taper will exceed two times the centered spacing between the sleeve inner wall and the post outer wall, in the present example exceeding $\frac{1}{8}$ inch.

The axial force is applied by nut and bolt assembly 14, which comprises a bolt 24 inserted through the apertures in the flanged ends 16 and 20. The bolt 24 is tightened down by a nut 26 working against a lock washer 28 and flat washer 30. Accordingly, the application of axial force to the pieces 10 and 12 by the nut and bolt assembly is translated by the pronged ends 18 and 22 into a radial force which, in response to a sufficient axial force, brings the inner wall of sleeve member 4 and outer wall of post member 6 into intimate contact so as to result in a fixed frictional coupling between the sleeve and post members that provides extremely stable support of the dock sections. The body of pieces 10 and 12 are provided with boss members 32 and 34, respectively, which come into contact with the outer wall of sleeve member 4 for assisting in the translation of the axial force to the radial force.

Although the invention has been described with respect to specific embodiments thereof for the purpose of a clear and complete disclosure, it may be appreciated that the described structure may have a more general application for clamping together mating post and sleeve members, and that numerous changes and modifications can be made to the described structure by ones skilled in the art without departing from the true scope and spirit of the present invention, which is not to be limited except as defined by the appended claims.

What I claim as new and desire to secure as Letters Patent of the United States is:

1. In combination with a dock support structure for supporting a dock section at an adjusted height which includes at least a pair of post members slidable in the axial direction within corresponding sleeve members attached to either side of said dock section, the outer wall of said post members being in close proximity with the inner wall of said sleeve members when said members are centered on one another, a dock clamp for securing said post members to corresponding sleeve members at said adjusted height, comprising:
   (a) prong means for insertion at opposing ends and at one side of one of said sleeve members between the inner wall of said sleeve member and the outer wall of a corresponding post member, said prong means being constructed so as to apply a radial force to said inner and outer walls in a direction that drives said walls together at the side opposite to said one side in response to an applied axial force, and
   (b) further means for applying an axial force to said prong means, whereby the application of sufficient axial force provides a fixed frictional coupling between corresponding post and sleeve members.

2. A dock clamp as in claim 1 wherein said prong means comprises a pair of rigid pieces each including an open end and a pronged end having a tapered configuration which allows said pronged end to be wedged between said inner and outer walls at each of said opposing ends of said sleeve member.

3. A dock clamp as in claim 2 wherein said further means comprises fastener means for pulling facing open ends of said pair of rigid pieces toward one another.

4. A dock clamp as in claim 3 wherein the open end of each of said pair of rigid pieces is provided with an aperture and said fastener means comprises a bolt member that passes through each of said apertures and is tightened down on said open ends by a screw thread arrangement.

5. A dock clamp as in claim 4 wherein said rigid pieces and bolt member are composed of a rust resistant material.

6. A dock clamp assembly for supporting a dock section at an adjusted height, comprising:
   (a) at least one pair of sleeve members attached to either side of said dock section for receiving corresponding post members that are slidable in the axial direction within said sleeve members, the outer wall of said post members being in close proximity with the inner wall of said sleeve members when said members are centered on one another,
   (b) prong means for insertion at opposing ends and at one side of one of said sleeve members between the inner wall of said sleeve member and the outer wall of a corresponding post member, said prong means being constructed so as to apply a radial force to said inner and outer walls in a direction that drives said walls together at the side opposite to said one side in response to an applied axial force, and
   (c) further means for applying an axial force to said prong means, whereby the application of sufficient axial force provides a fixed frictional coupling between corresponding post and sleeve members.

7. A dock clamp assembly as in claim 6 wherein said prong means comprises a pair of rigid pieces each including an open end and a pronged end having a tapered configuration which allows said pronged end to be wedged between said inner and outer walls at each of said opposing ends of said sleeve member.

8. A dock clamp assembly as in claim 7 wherein said further means comprises fastener means for pulling facing open ends of said pair of rigid pieces toward one another.

9. A dock clamp assembly as in claim 8 wherein the open end of each of said pair of rigid pieces is provided with an aperture and said fastener means comprises a bolt member that passes through each of said apertures and is tightened down on said open ends by a screw thread arrangement.

10. A dock clamp assembly as in claim 9 wherein said rigid pieces and bolt member are composed of a rust resistant material.

* * * * *